Sept. 11, 1934.  A. POTDEVIN  1,972,902
APPARATUS FOR HANDLING STRIP MATERIAL
Filed Jan. 8, 1932
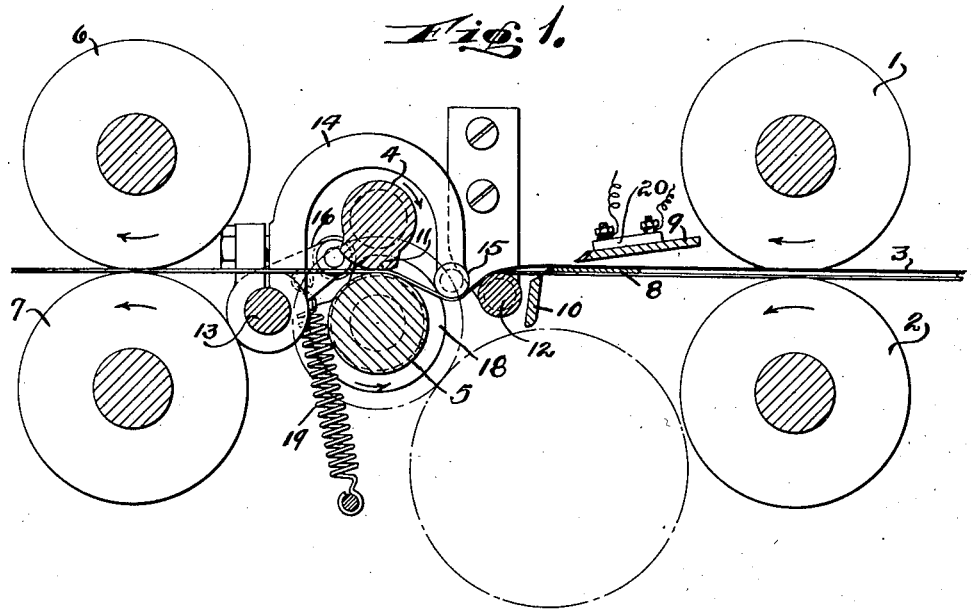
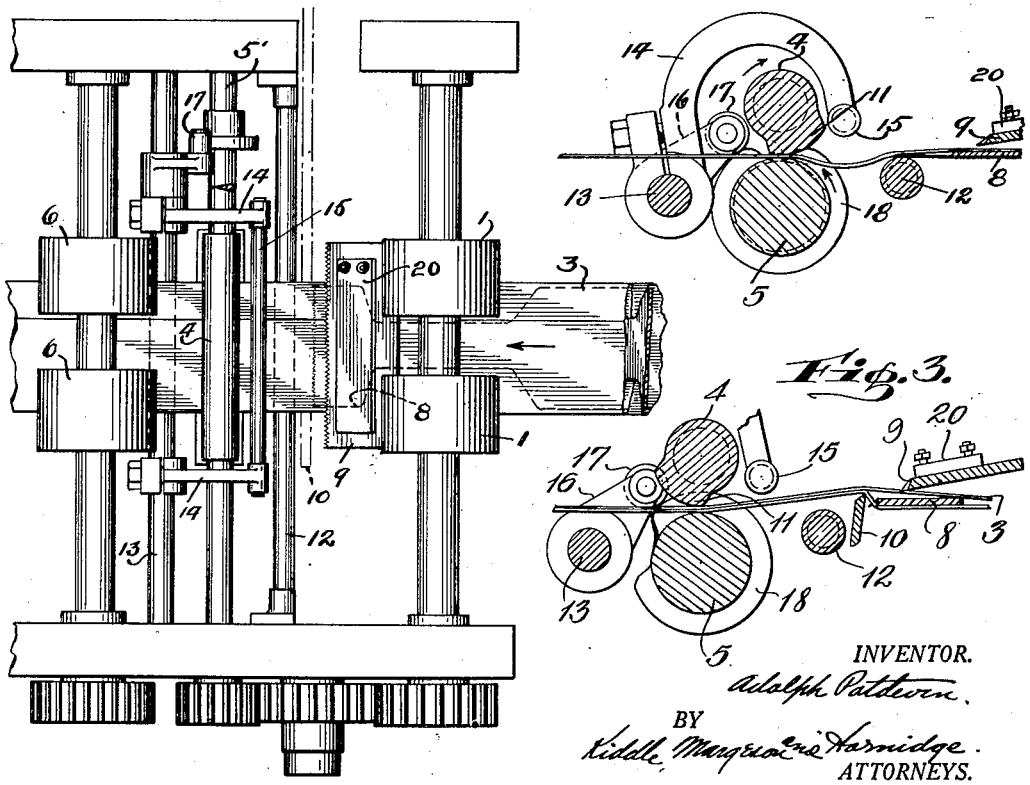
INVENTOR.
Adolph Potdevin
BY
Kiddle, Marqueseire Harmidge
ATTORNEYS.

Patented Sept. 11, 1934

1,972,902

UNITED STATES PATENT OFFICE 1,972,902

APPARATUS FOR HANDLING STRIP MATERIAL

Adolph Potdevin, Garden City, N. Y., assignor to Potdevin Machine Company, Brooklyn, N. Y., a corporation of New York Application January 8, 1932, Serial No. 585,518

5 Claims. (Cl. 271—2.1)

The present invention relates to an apparatus for handling strip materials and is particularly well adapted for the handling of material such as cellophane, for example, although also well adapted for the handling of paper or other flexible webs.

In the making of cellophane bags or tubes, for instance, where the cellophane is taken from a supply roll and fed forward in web form, to be fabricated into bags or tubes, it is necessary of course that the material be cut into bag lengths or tube lengths and I have found it difficult to perform the cutting off operation inasmuch as such materials tear very readily and also if any creases or wrinkles are formed in the material the same will shatter and be rendered unfit for use.

The present invention has for one of its objects the provision of a machine for facilitating the cutting-off operation without creasing or wrinkling material or otherwise damaging the same.

I have also provided for slightly heating the cutting-off mechanism which particularly adapts the present apparatus to the handling of materials such as cellophane in that the cellophane may be cut with more facility and accuracy if the cutting mechanism be slightly heated than when the same is cold.

In bag making machines it is quite usual to provide feed rollers for continuously advancing the material to a pair of pinch rolls, these rolls being so constructed and so timed with relation to the surface speed of the feed rolls as to retard the advance of the web and allow the feed rolls to build up a slack in the web just prior to the cutting-off operation which is performed intermediate the feed and pinch rolls. In such constructions, therefore, we have a condition where an uncontrolled slack is built up in the web, from the feed rollers to the pinch rolls, and the cutting-off operation is performed at this slack area.

The present invention provides an apparatus equipped with feed rollers and pinch rolls as before for producing slack in the web, means being provided, however, for preventing the accumulation or building up of slack between the cutting-off mechanism and the feed rollers thereby preventing wrinkling or creasing of the material back of the cutting-off mechanism, i. e., between the cutting-off mechanism and the feed rollers, and permitting the desired proper severance of the strip.

In the accompanying drawing:

Fig. 1 is a sectional elevational view of an embodiment of my invention;

Fig. 2 is a similar view of a portion of the mechanism of Fig. 1 with the parts in slightly different position;

Fig. 3 is a view similar to Figs. 1 and 2 but showing the parts in another position; and Fig. 4 is a plan view.

Referring to the drawing in detail, 1 and 2 designate the upper and lower feed rollers of a machine for handling flexible material in the web, 3 designating the material. The material 3, as above noted, may be paper, such as commonly employed in bag making, for example, or it may be cellophane or other material.

The rolls 1 and 2 advance the material to pinch rolls 4 and 5, the material then passing to the forwarding rolls 6 and 7, the pinch rolls lying intermediate the feed rolls and the forwarding rolls.

The cutting-off mechanism which lies intermediate the feed and pinch rolls comprises stationary plates 8 and 9 and striker bar 10. This mechanism is well known and no attempt has been made to show the same in great detail.

As will be apparent from the drawing the web 3 as it is advanced by feed rollers 1 and 2 will pass between the pinch rolls 4 and 5 during a portion of the advance of the material and at a predetermined instant the high area 11 on pinch roll 4 will have rotated into position so that the material 3 is nipped or pinched and the progress or advance of the web retarded, the pinch rolls traveling at a slower peripheral speed than that of the feed rollers, thereby producing a slack in the web.

Adjacent the striker bar 10 is a roller 12 mounted in the machine frame and in such position that the material 3 passes over the upper face thereof, this roller providing a support for the web as it leaves the cutting-off station and passes to the pinch rolls.

At the side of the pinch rolls opposite the roller 12 is a rock shaft 13, carrying a pair of arms 14 which support a rod or roller 15 extending transversely of the travel of the web 3.

The shaft 13 also carries an arm 16 equipped with a roller 17 adapted to engage a cam 18 on the shaft 5' for the lower pinch roll, to raise the free ends of the arms 14 and hence the roller 15. The arm 16 is provided with a spring 19 for holding the roller 17 on cam 18 when the machine is in operation.

When working with cellophane, for instance, or similar materials I prefer to heat the fixed cut-off plate 9. This is conveniently done by equipping this plate with an electric hot plate 20 and facilitates severing of the cellophane.

In operation the material 3 is advanced in the usual way by the feed rollers 1 and 2, the web advancing at a predetermined definite speed. As the web leaves the cutting-off station it passes over the idler roller 12 which holds it in position so that it will enter between the pinch rolls 4 and 5, and from whence it advances to forwarding rolls 6 and 7. As previously explained the peripheral speed of the active portion of the pinch rolls 4 and 5 is slower than the peripheral speed of the feed rollers 1 and 2. The material 3 can advance for a predetermined distance, depending upon the setting of the machine, until the portion 11 becomes active whereupon the advance of the web is retarded to produce a slack therein, as shown in Figs. 1 and 2. Up to this time the cam 18 has been in position to maintain the roller 15 out of engagement with the face of the advancing material. Fig. 2 shows the approximate position of the parts at this time.

Continued operation of the machine, however, advances the cam 18 sufficiently to move the same out from beneath the cam follower 17 and permit the roller 15 to move downwardly into engagement with the slack portion of the material as illustrated in Fig. 1, to maintain tension in the web 3 from the cutting-off mechanism to the feed rollers 1 and 2.

Continued rotation of the pinch rolls finally brings the leading end of the cam 18 again into engagement with cam follower roller 17 to raise the roller 15, as the striker bar raises the web 3 in the cutting-off operation.

From the foregoing it will be seen that I have provided a machine for the handling of flexible material in the form of a continuously progressing web or strip in which means have been provided for preventing wrinkling or creasing of the material between the cut-off mechanism and the feed rollers.

It is to be understood that changes may be made in the details of construction above described within the spirit and scope of my invention.

What I claim is:—

1. In a machine of the class described, the combination of feed rollers for continuously advancing a flexible strip, pinch rolls for retarding the advance of the strip to produce a slack therein, web engaging means, and means for moving said web engaging means into and out of engagement with the slack portion of the material to maintain tension in that portion of the material lying between the web engaging means and the feed rollers.

2. In a machine of the class described, the combination of feed rollers for continuously advancing a flexible strip or web, pinch rolls in the path of said advancing strip for retarding the advance thereof and to produce a slack therein, web engaging means, and means for moving said web engaging means into and out of engagement with the web intermediate the feed rollers and the pinch rolls for deflecting the slack portion of the web so as to maintain tension in the web between the web engaging means and the feed rollers.

3. In a machine of the class described, the combination of feed rollers for continuously advancing a flexible strip or web, pinch rolls adapted to intermittently pinch the web and retard the forward advance thereof to build up a slack in the web, a web supporting roll intermediate the feed rollers and pinch rolls, and a roller overlying the web and adapted to engage the slack portion thereof to maintain tension in the web between the web supporting roller and the feed rollers.

4. In a device of the class described, the combination of feed rollers for continuously advancing a flexible strip, pinch rolls for intermittently retarding the advance of the strip to produce a slack therein, an arm, a roller carried by said arm and overlying the web, and a cam and spring for actuating said arm to bring the said roller into and out of engagement with the slack portion of the web to maintain tension in the web between the web engaging means and the feed rollers.

5. In a device of the class described, the combination of feed rollers for continuously advancing a flexible strip, pinch rolls for intermittently retarding the advance of the strip to produce a slack therein, a web supporting roll intermediate the feed rollers and pinch rolls, an arm, a roller carried by said arm and overlying the web, and a cam and spring for actuating said arm to bring said roller into and out of engagement with the slack portion of the web to maintain tension in the web between the web supporting roller and the feed rollers.

ADOLPH POTDEVIN.